Sept. 20, 1966  G. W. JONES  3,273,421
TIMER TRANSMISSION
Filed June 4, 1963  2 Sheets-Sheet 1

INVENTOR.
Gerald W. Jones,
BY William G. Landwier
agent

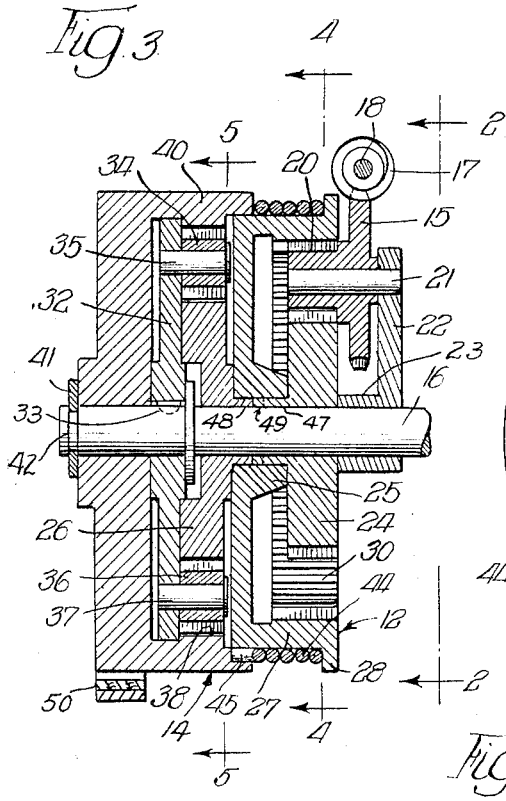
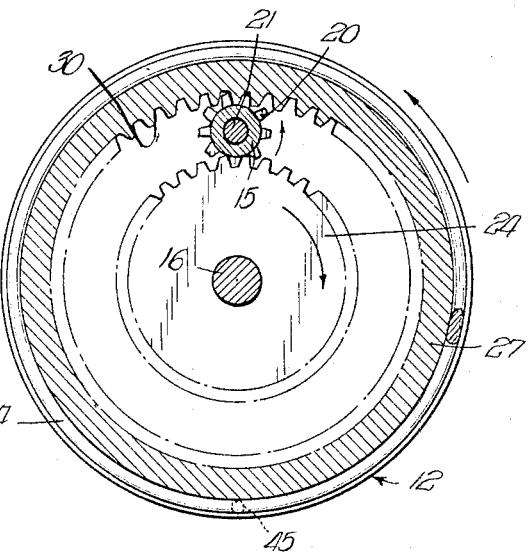
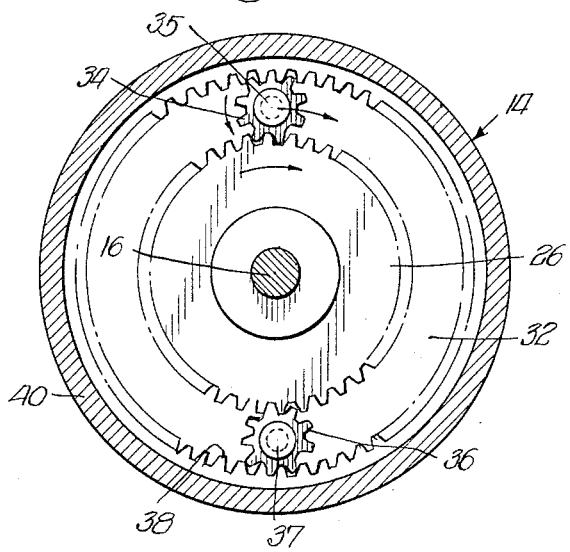

United States Patent Office 3,273,421
Patented Sept. 20, 1966

3,273,421
TIMER TRANSMISSION
Gerald W. Jones, Newton, Iowa, assignor to The Maytag Company, Newton, Iowa, a corporation of Delaware
Filed June 4, 1963, Ser. No. 285,509
12 Claims. (Cl. 74—705)

The invention relates to transmission mechanism and has reference more particularly to a combined planetary gear device whereby an output shaft can be driven selectively at different speeds for any particular speed of a constantly rotating input shaft.

The gear drive of the invention has been primarily designed to function as a driving element for timing mechanism wherein switch devices are actuated so as to obtain certain timed sequential operation. Accordingly, the present gear drive is a two speed device having selective operation at either a slow speed or at a high speed and wherein the change from one speed to the other can be attained by employing a force applied to one of the ring gears to hold the same stationary.

Another object of the invention resides in the provision of transmission gearing characterized in that sun gears and planet gears are employed in a unique combination with two operatively associated ring gears and which are frictionally coupled so that both ring gears may rotate in the same direction as a unit or wherein one may be held stationary while the other ring gear rotates relative thereto.

Another object of the invention is to provide a gear drive which will employ a coil spring as a clutching device for frictionally coupling two operatively associated ring gears, whereby a change in speed of the output shaft will result when one of said ring gears is held against rotation and wherein by selecting the proper number of teeth for the various gear elements any two desired output speeds can be obtained.

Another object of the invention is to provide a gear drive of the character described wherein the annular flanges of the ring gears form a housing for the gear elements and wherein one or both of said ring gears will have relatively smooth annular peripheries for accommodating the spring clutching device.

With these and various other objects in view, the invention may consist of certain novel features of construction and operation as will be more fully described and particularly pointed out in the specification, drawings and claims appended hereto.

In the drawings which illustrate an embodiment of the device and wherein like reference characters are used to designate like parts FIGURE 1 is a perspective view of the transmission gear device of the invention;

FIGURE 3 is a sectional view taken on a vertical diameter substantially on line 3—3 of FIGURE 2 and showing an arrangement of the gear elements coming within the invention;

FIGURE 4 is a sectional view substantially along line 4—4 of FIGURE 3, and;

FIGURE 5 is a sectional view substantially along line 5—5 of FIGURE 3.

Figure 1:
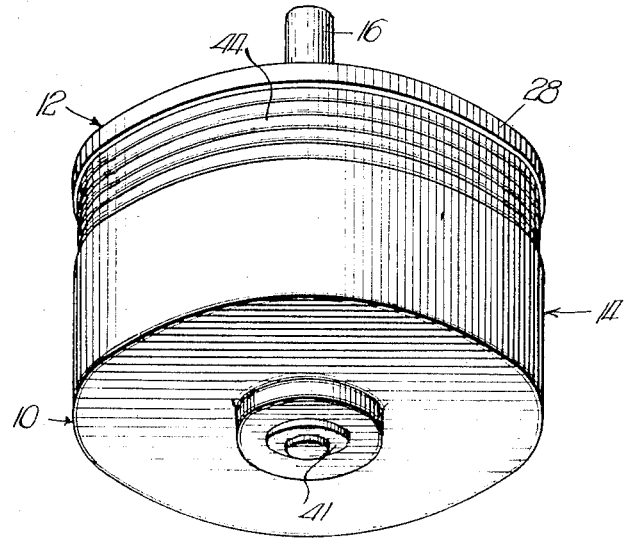
Figure 2:
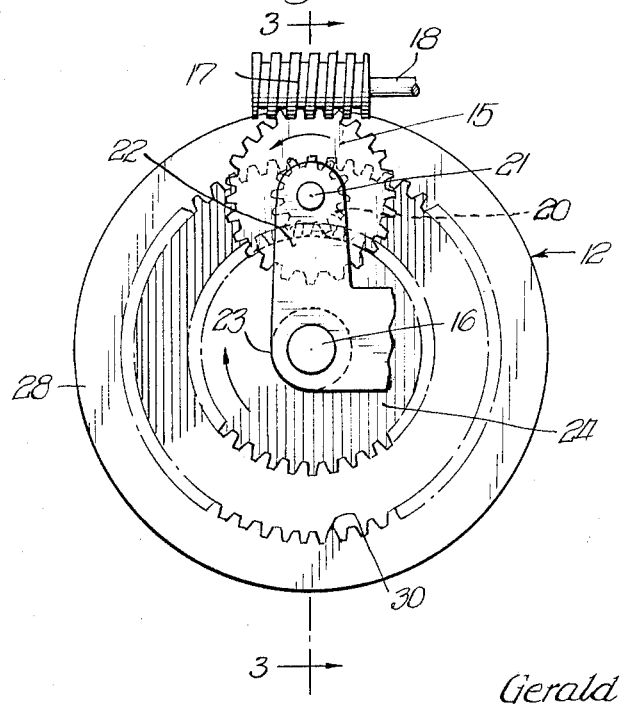
FIGURE 2 is an elevational view of the input-output end of the device taken substantially along line 2—2 of FIGURE 3.

In the embodiment selected for illustrating the invention, the numeral 10 generally indicates a complete transmission gear device including two ring gears 12 and 14, an input gear 15 and an output shaft 16. The drive to the input gear 15 may comprise a worm gear such as 17 mounted on and driven by the power shaft 18. The worm gear 17 meshes with and drives the input gear 15 which has a pinion 20 formed integrally therewith. The combination gear and pinion is supported for free rotation on the fixed shaft 21 which is held by the frame part 22. Said frame part provides a hub 23 which receives the output shaft 16 and helps to support the same for rotation.

The input gear 15, by means of the pinion 20, drives a sun gear 24 supported for independent rotation on the output shaft 16 and said pinion 20 also drives the ring gear 12 of the device. The said ring gear is disposed concentrically with respect to output shaft 16 and the central hub portion 25 of said ring gear is located between the sun gear 24 and a second sun gear 26. The periphery of ring gear 12 is flanged as at 27, the flange including the lip 28. The flange 27 carries the internal gear teeth 30 and said pinion 20 has meshing relation with said teeth to thus drive the ring gear as described.

The hub portions 47 and 48 of sun gears 24 and 26, respectively, are joined or connected in any suitable manner, such as axially interlocking face coupling 49 as indicated in FIGURE 3 so that rotation of 24 is imparted to 26. The sun gear 26 is also supported on the output shaft 16 for rotation independently of the shaft. The carrier 32 is keyed at 33 to the output shaft 16 and said carrier coacts with the sun gear 26 by means of the planet gears 34 and 36. The said planet gears are rotatably carried at respective ends of the carrier by the fixed shafts 35 and 37.

The planet gears 34 and 36 have meshing relation with the teeth of the sun gear 26 and the planet gears also have meshing relation with the teeth 38 formed internally of the flange 40 provided by the ring gear 14. The ring gear is mounted on the output shaft for independent rotation and at this end of the device the output shaft is provided with the end washer 41 which is held in place by the groove 42 of the shaft.

In accordance with the invention, means are provided for selectively coupling ring gears 12 and 14. This coupling or clutch device may include conventional resilient or frictional devices and in the preferred embodiment specifically includes the coil spring 44. Spring 44 has encircling relation with ring gear 12, the convolutions of the coil spring extending around the periphery of said ring gear. One end of the coil spring is secured to the flanged edge 40 of gear 14 as at 45, and the other end of the coil spring engages the lip 28. Accordingly, the spring is confined between ring gear 14 and lip 28 of ring gear 12. The engagement between the coil spring 44 and the ring gear 12 produces a friction coupling between the ring gears which, however, may be released or overcome by holding or creating a drag on ring gear 14. The holding device may include releasable exterior clutches or friction holding devices, such as brake 50, and may be either manually or automatically actuated.

When the ring gear 14 is free to rotate, the output shaft 16 will rotate at a low rate of speed for any particular speed applied to the input gear 15. However, when the ring gear 14 is held against rotation the shaft 16 will rotate at a much higher rate of speed. For low speed operation it will be observed that the drive from input gear 15 is transmitted to the pinion 20, sun gear 24 and sun gear 26 which will be driven at one rate of speed. Planet gears 34 and 36 driven by sun gear 26 will drive ring gear 14 which will in turn drive ring gear 12 through the clutching action of left hand coil spring 44. Ring gear 12, having meshing relation with pinion 20, however, is limited in its rotational velocity and will in turn react to limit the rotational speed of ring gear 14. The planet gears 34 and 36 will react on the ring gear 14, which is moving slower than sun gear 26, and will accordingly travel around ring gear 14 to rotate carrier 32 and output shaft 16 at a rate which is a function of the difference in speed of sun gear 26 and ring gear 14. With ring gear 14 rotating, the difference in circumferential speed of sun gear 26 and ring gear 14 is a minimum as compared to the difference when ring gear 14 is held against rotation. The planet gears are thus displaced in a circular path about the axis of output shaft 16 at a slow rate for rotating carrier 32 and output shaft 16 at a slow speed. In other words, a high reduction in speed has been effected between input and output.

When the ring gear 14 is held against rotation the coil spring 44 slips relative to ring gear 12 and as a result said ring gear 12 rotates as before but ring gear 14 remains stationary. The drive for shaft 16 is through pinion gear 20, sun gears 24 and 26, the latter gear reacting on planet gears 34 and 36. The planet gears in turn react on teeth 38 of the ring gear 14 which is now held against rotation. With gear 14 being held stationary, the planet gears move in their circular path at a much higher speed. Similar movement is thus transmitted to the carrier 32 and through the carrier this higher speed is transmitted to output shaft 16. The speed of the output for a given input speed has thus been increased, the magnitude of which will depend on the ratios of the gear elements. The proper number of teeth may be selected so as to give any two desired output speeds.

The two output speeds of the disclosed preferred embodiment may be determined by use of the two following formulas:

$$\text{Slow speed output} = \frac{N_{20}(N_{24}N_{14} - N_{12}N_{26})(V_{20})}{N_{24}N_{12}(N_{26} + N_{14})}$$

$$\text{Fast speed output} = \frac{(N_{20}N_{26})(V_{20})}{N_{24}(N_{26} + N_{14})}$$

Where $N_{12}$ = number of internal teeth on ring gear 12
$N_{14}$ = number of internal teeth on ring gear 14
$N_{20}$ = number of teeth on input pinion 20
$N_{24}$ = number of teeth on sun gear 24
$N_{26}$ = number of teeth on sun gear 26
$N_{34}$ = number of teeth on planet gear 34
$V_{20}$ = rotational velocity of input pinion 20

In a typical embodiment, the following gearing has been found to give satisfactory results. It is noted that the teeth in the drawings are shown diagrammatically and do not necessarily show correct number of teeth for this embodiment.

Number of internal teeth on ring gear $12 = N_{12} = 63$
Number of internal teeth on ring gear $14 = N_{14} = 70$
Number of teeth on input pinion $= N_{20} = 10$
Number of teeth on sun gear $24 = N_{24} = 43$
Number of teeth on sun gear $26 = N_{26} = 48$
Number of teeth on planet gear $34 = N_{34} = 11$
Rotational velocity of input pinion $20 = V_{20} = 220$ r.p.m.

The output speeds for this embodiment are thus obtained by use of the above formulas. The output speeds are as follows:

Slow speed output $= -0.096$ r.p.m.
Fast speed output $= -20.8$ r.p.m.

The minus results in these calculations indicate that the slow and fast output rotations are in the same direction and opposite to the input direction of rotation.

For an understanding of how the present gear device may be employed in a practical manner reference is made to the pending application of Thomas R. Smith, Serial No. 144,874, now Patent No. 3,178,525, filed October 13, 1961, for "Timing Belt Operated Switches and Switch Mechanism." The said application includes a disclosure of the gear drive of this invention and illustrates how the same may be employed for operating an endless belt for in turn actuating a plurality of electric switches.

The invention is not to be limited to or by details of construction of the particular embodiment thereof illustrated by the drawings, as various other forms of the device will, of course, be apparent to those skilled in the art without departing from the spirit of the invention or the scope of the claims.

I claim:

1. In a power transmission mechanism including an input element and an output element, the combination comprising: first and second relatively rotatable ring gears each having circumferential teeth; a gear assembly including a central gear portion and a sun gear portion; a first gear element, said central gear portion and said first gear element having meshing relationship and being driven by said input element, said first gear element also having meshing relationship with the circumferential teeth of said first ring gear; drive means including a second gear element interposed between said sun gear portion and the circumferential teeth of said second ring gear, said drive means having a driving relationship with the output element; and means for selectively controlling the relative rotation of said second ring gear to said first ring gear.

2. In a power transmission mechanism as defined by claim 1, wherein the controlling means includes a member releasably coupling the ring gears.

3. In a power transmission mechanism as defined by claim 1, wherein the controlling means includes a member releasably coupling said first and second ring gears and a member for controlling rotation of said second ring gear.

4. In a power transmission mechanism including an input member and an output member, the combination comprising: first and second relatively rotatable coaxially mounted ring gears each having circumferential teeth; a gear assembly including a central gear portion and a sun gear portion; a first gear element driven by said input member and interposed between said central gear portion and the circumferential teeth of said first ring gear; drive means including a second gear element interposed between said sun gear portion and the circumferential teeth of said second ring gear, said drive means having a driving relationship with the output member; and means for selectively controlling the relative rotation of said second ring gear to said first ring gear.

5. In a power transmission mechanism including an input element and an output member, the combination comprising: first and second relatively rotatable ring gears each having circumferential teeth and being mounted coaxially to said output member for rotation relative thereto; a connected central gear and sun gear assembly also mounted coaxially to said output member for rotation relative thereto; a first gear element driven by said input element interposed between said central gear and the circumferential teeth of said first ring gear; drive means including a second gear element interposed between said sun gear and the circumferential teeth of said second ring gear, said drive means having a driving relationship with the output member; means releasably connecting said first and second ring gears; and means for selectively controlling the rotation of said second ring gear to effect relative motion between said first and second ring gear.

6. In a power transmission mechanism as defined by claim 5, wherein said output member is in the form of a shaft and wherein said first and second ring gears and said connected central and sun gears are mounted on said output shaft for rotation relative thereto.

7. In a power transmission mechanism including an input element and an output shaft, the combination comprising: relatively rotatable first and second ring gears each having circumferential internal teeth; a central gear and a sun gear connected for rotation at the same speed; a pinion driven by said input element and interposed between the circumferential internal teeth of said first ring gear and said central gear; at least one planet gear interposed between the circumferential internal teeth of said second ring gear and said sun gear; a carrier having a driving relationship with the output shaft and rotatably mounting said planet gear; a releasable member frictionally coupling the ring gears; and means for selectively controlling the rotation of said second ring gear to effect relative motion between said first and second ring gears.

8. In a power transmission mechanism as defined by claim 7, wherein said first and second ring gears are mounted coaxially to said output shaft for rotation relative thereto and wherein said central and said sun gears are mounted concentrically to said first and said second ring gears respectively for rotation relative to said output shaft.

9. In a power transmission mechanism as defined by claim 7, wherein said first and said second ring gears are supported on said output shaft for rotation relative thereto, and wherein said central and said sun gears are supported on said output shaft for rotation relative thereto.

10. In a planetary gear device including an input element and an output shaft, the combination comprising: first and second relatively rotatable ring gears each having circumferential internal teeth and being supported coaxially to said output shaft for rotation relative thereto; a central and a sun gear located concentrically within said first and second ring gears respectively and supported for relative rotation to said output shaft, said central and said sun gears having a connected relationship for rotation as a unit; a pinion driven by the input element and meshing with said central gear and said first ring gear; at least one planet gear meshing with said sun gear and said second ring gear; a carrier mounting said planet gear and having a driving relationship with said output shaft for transmitting rotation thereto; a spring clutch member drivingly connected to one of said ring gears and having encircling relationship with the periphery of the other of said ring gears to provide a releasable friction coupling for said ring gears; and selectively operable holding means for limiting the rotation of said second ring gear to effect relative motion between said first and second ring gears.

11. In a power transmission mechanism including an input element and an output shaft, the combination comprising: a first ring gear and a second ring gear each having circumferential internal teeth and being supported for rotation relative to said output shaft; a central gear and a connected sun gear mounted for rotation relative to said output shaft; a first gear element driven by said input element and interposed between said central gear and the circumferential internal teeth of said first ring gear; a driving means including a plurality of planet gears interposed between said sun gear and the circumferential teeth of said second ring gear, said driving means having a driving relationship with the output shaft; and a spring clutch member fixed to one of said ring gears and having encircling relation with the periphery of the other of said ring gears to provide a normally engaged friction coupling for said ring gears; and selectively operable brake means for limiting the rotation of said second ring gear to effect relative rotation between said first and second ring gears.

12. In a power transmission mechanism including an input element and an output shaft, the combination comprising: first and second relatively rotatable ring gears each having circumeferential internal teeth and being supported coaxially to said output shaft for rotation relative thereto; a central gear and a sun gear having connected relationship for rotation at the same speed also mounted coaxially to said output shaft for rotation relative thereto; a first gear element driven by said input element interposed between said central gear and the circumferential internal teeth of said first ring gear; drive means including a plurality of planet gears interposed between the said sun gear and the circumferential internal teeth of said second ring gear, said drive means having a driving relationship with said output shaft; a spring clutch member drivingly connected to said first and said second ring gears for providing a releasable friction coupling between said ring gears; and selectively operable means for preventing rotation of said second ring gear to effect relative rotation between said first and second ring gears.

References Cited by the Examiner

UNITED STATES PATENTS

| | | | |
|---|---|---|---|
| 991,754 | 5/1911 | Schoonmaker | 74—785 |
| 995,552 | 6/1911 | Osborn | 74—705 |
| 1,376,954 | 5/1921 | Lissman | 74—705 |
| 1,604,112 | 10/1926 | Bultman | 74—705 |
| 2,907,229 | 10/1959 | Mueller | 74—705 X |
| 3,178,525 | 4/1965 | Smith | 200—38 |

DAVID J. WILLIAMOWSKY, *Primary Examiner.*

DON A. WAITE, *Examiner.*

T. C. PERRY, *Assistant Examiner.*